United States Patent

Berglund et al.

[15] 3,648,122

[45] Mar. 7, 1972

[54] METAL-INSULATOR-METAL SOLID-STATE RECTIFIER

[72] Inventors: Carl Neil Berglund, Plainfield; Edward Haig Nicollian, Murray Hill, both of N.J.

[73] Assignee: Bell Telephone Laboratories, Incorporated, Murray Hill, N.J.

[22] Filed: June 19, 1970

[21] Appl. No.: 47,739

[52] U.S. Cl. .................................317/234, 317/101, 29/576

[51] Int. Cl. ..........................................................H01l 19/00

[58] Field of Search...................317/230, 231, 233, 238, 234

[56] References Cited

UNITED STATES PATENTS

| | | | |
|---|---|---|---|
| 2,083,254 | 6/1937 | Cawles | 317/230 |
| 2,537,255 | 1/1951 | Brattain | 136/89 |
| 2,736,848 | 2/1956 | Rose | 317/235 |
| 2,861,909 | 11/1958 | Ellis | 148/33 |
| 3,139,568 | 6/1964 | Ishikawa et al. | 317/230 |
| 3,206,670 | 9/1965 | Atalla | 323/93 |

*Primary Examiner*—James D. Kallam
*Attorney*—R. J. Guenther and Arthur J. Torsiglieri

[57] ABSTRACT

A metal-insulator-metal layered structure is disclosed which is useful as a rectifier of AC voltage. One of the metal layers is advantageously in the form of a crossgrid-type geometry, in order to afford a large perimeter of contact with the insulator layer. Electrons are injected at the edges of the metal grid through the insulator when the grid goes electrically negative, but not when it goes positive; thereby, rectifying properties are afforded by this metal-insulator-metal structure.

7 Claims, 1 Drawing Figure

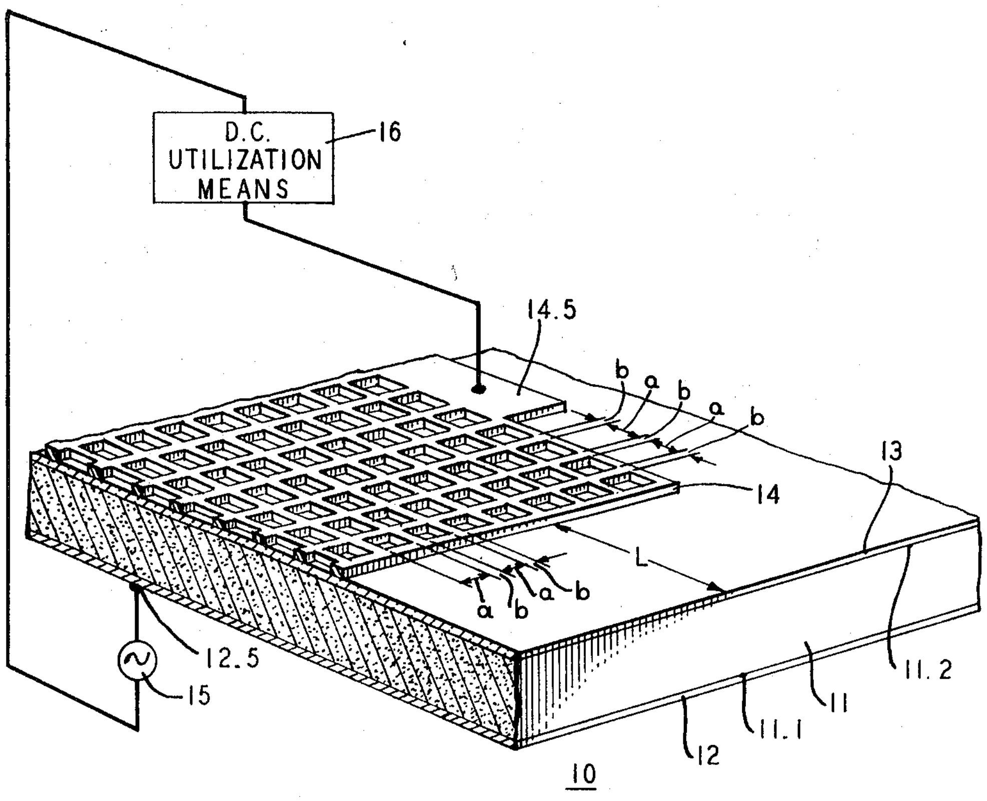
INVENTORS C. N. BERGLUND
E. H. NICOLLIAN
BY D. Caplan
ATTORNEY

METAL-INSULATOR-METAL SOLID-STATE RECTIFIER

FIELD OF THE INVENTION

This invention relates to solid-state electron devices, and more particularly, to rectifying devices utilizing an electrical barrier layer.

BACKGROUND OF THE INVENTION

In the prior art, metal-insulator-metal type layered structures have been described which have a switching characteristic, i.e., a sudden increase in current response to applied voltages above a threshold. For example, in the U.S. Pat. No. 3,056,073 issued to C. A. Mead on Sept. 25, 1962, there is specifically described such a solid-state electron device in the form of a diode having two layers of electrically conductive metal separated by an insulating layer. The electrical characteristics of such a diode are antisymmetric, that is, the current through the diode in response to an applied voltage in one direction is equal but opposite to the current in response to an applied voltage in the opposite direction. In view of its relatively simple structure, it would be desirable to have such a diode structure which would exhibit rectification properties, that is, a diode in which the current response does not have any symmetry, but in which the threshold voltage in one direction ("forward") is considerably larger than the threshold voltage in the opposite ("reverse") direction. Such a device would then be useful as a rectifier for AC voltages whose positive and negative peaks lie intermediately between these two threshold voltages.

SUMMARY OF THE INVENTION

A metal-insulator-metal layered structure in which the "effective" perimeter of one of the metal layers is considerably larger (by several orders of magnitude or more) than the "effective" perimeter of the other metal layer has been found to exhibit the desired rectification property. By "effective" perimeter is meant only that portion of the perimeter of one electrode which is located substantially opposite to at least a portion of the other electrode. Thus, in the extreme example of a single point contact electrode located on a surface of the insulator layer opposite to a relatively large area plate electrode, the "effective" perimeter of the plate electrode is zero, yet the "effective" perimeter of the point contact electrode is equal to the actual perimeter of its contact area on the insulator layer. It will be appreciated that, in response to applied voltages to the electrodes, only in the neighborhood of the "effective" perimeter of an electrode will the electric fields in the insulator layer be extremely high as compared with elsewhere in the insulator layer. Therefore, only the "effective" perimeter is of importance for rectifying properties, as will become clearer from the following.

A metal-insulator-metal layered structure, having an extremely high ratio of "effective" perimeters of the two metal layers, has been found to exhibit an extremely high rectification ratio, that is, the ratio of peak forward current to peak reverse current. Rectification ratio above $10^{14}$ have been achieved, provided the bulk resistivity of the insulator layer is at least $10^{18}$ ohm-cm., and the thickness thereof at least about 2,000 A. It is believed that this rectifying property is attributable to the very high electric fields (of the order of $10^8$ and $10^9$ volt per cm produced in the insulator layer in the neighborhood of approximately 30 A. of the "effective" perimeter (edges) of the metal layer. These electric fields in the forward direction serve to inject electrons from the edges of the metal layer of larger perimeter into the insulator, by overcoming the electric barrier ordinarily present at a metal-insulator interface. After such injection, these electrons are simply propelled by the electric field through the insulator to the other metal layer, with a mobility in excess of 10 cm.$^2$ per volt second in silicon dioxide for example. Moreover, in the reverse direction, the relatively high bulk resistivity of the insulator layer limits the reverse current through the device to an extremely low value, thereby providing an extremely high rectification ratio.

In order to achieve the aforementioned high rectification ratios, it is important the frequency of the AC voltage to be rectified be sufficiently high, typically at least about 50 Hz. The use of substantially lower AC frequencies is less desirable because it may allow sufficient time, during each cycle, for surface leakage currents to build up undesirable space charges on the insulator surface. These space charges would tend to neutralize the high electric field in the neighborhood of the perimeter of the injecting electrode, and thereby reduce the injection efficiency of electrons into the insulator. Moreover, in order that the electrons, injected into the insulator from the metal layer having the large perimeter, reach the other ("collecting") metal layer rather than create space charges in the insulator, it is also important that the insulator layer be relatively free from impurities which produce traps. In addition, as mentioned above, the bulk resistivity of the insulator advantageously is extremely high in order to limit (bulk) leakage current. The present-day art of insulator layer fabrication makes such criteria readily attainable in practice. It should also be understood in this connection that a semiconductor substrate can serve as a collecting layer as well as an ordinary electrically conducting metal layer, in view of the metallike (i.e., electrically conducting) properties of semiconductors, especially degenerate N-type semiconductors.

An example of an insulator useful in this invention is silicon dioxide having a bulk resistivity of the order of $10^{18}$ ohm-cm. or more, thermally grown in dry oxygen. Alternatively, an insulator layer of aluminum oxide grown on aluminum by plasma anodization is useful.

It should be stressed in any event that the thickness of the insulator layer in this invention should be large enough to prevent avalanche breakdown under reverse applied voltages used in operation. Thus, for example, a thermally grown silicon dioxide insulator layer should have a thickness of at least about 20 A. per applied AC volt (peak).

In a specific embodiment of the invention, upon a major surface of a degenerate N-type wafer of silicon, is disposed a thermally grown layer of silicon dioxide, having a bulk resistivity of $10^{18}$ ohm-cm. or more. The layer of silicon dioxide is covered on its exposed surface with a crossed grid-type electrode arrangement of vapor-deposited gold. Upon another major surface of the silicon wafer, opposite the layer of silicon dioxide is disposed a single metal electrode contact, for external electrical series connection to an AC voltage source and a DC utilization means.

BRIEF DESCRIPTION OF DRAWING

This invention together with its features, advantages, and objects can be better understood from the following Detailed Description when read in conjunction with the drawing in which the FIGURE is a diagrammatic perspective view, partly in cross section, of a specific embodiment of the invention. For the purpose of clarity only, the FIGURE is not to scale.

DETAILED DESCRIPTION

As illustrated in the FIGURE, a rectifying diode 10 is electrically connected serially to an AC voltage source 15 and a DC utilization means 16. Thus, functionally the diode 10 serves as a rectifier of the AC voltage supplied by the source 15; and the diode 10 delivers a DC current in response to this AC voltage, which is utilized by the means 16.

The diode 10 includes advantageously a degenerate N-type silicon semiconductor substrate 11, that is, silicon containing a net significant impurity concentration of at least of the order of $10^{20}$ donors per cm$^3$. Typically, the substrate 11 has a thickness of 0.007 inch and a cross section of 0.1×0.1 inch. A continuous electrically conducting plate 12 covers the bottom surface of the substrate 11. Typically, the plate 12 is a layer of metal, such as aluminum which has been vapor deposited to a thickness of 2,000 A. on this bottom surface of the substrate 11. One terminal of the AC voltage source 15 is connected to the plate 12, typically by a lead wire which is bonded to the plate 12 at a terminal 12.5. The plate 12, in combination with the silicon substrate 11, serves as an electrode for the diode 10.

The top surface of the silicon substrate 11 is covered by an insulator layer 13 of silicon dioxide. Such a layer 13 can be formed advantageously by heating the silicon substrate 11 in a clean, sodium-free oven to a temperature of about 1,100° C. in the presence of dry oxygen. By reason of the cleanliness of the oven, the concentration of traps in the silicon dioxide layer 13 can advantageously be made less than of the order of $10^{14}$ per $cm^3$. The thickness of this layer 13 is made in proportion to the peak voltage supplied by the AC source 15, as discussed above. Thus, for a peak voltage of 600 volts, the thickness of the insulator layer 13 is advantageously about 10,000 A.

On the exposed surface of the insulator layer 13 is disposed a crossgrid electrode 14. Typically, this electrode 14 is a metal, such as gold, which has been vapor deposited to a thickness of about 200 A. on the surface of the insulator layer 13. In order to afford a large perimeter, the width (denoted by *a* in the FIGURE) of each square-shaped aperture in the electrode 14 is about 5 mils, whereas the distance ($a+b$) between centers of adjacent apertures is about 7 mils. A metal pad 14.5, in contact with the electrode 14, serves as a terminal for the electrical connection of the DC utilization means 16.

Advantageously, the distance (denoted by L) between the nearest edge of insulator layer 13 and the edge of the electrode 14 is at least an order of magnitude larger than the thickness of the insulator layer 13 itself. Thereby, during operation, whereas electric fields of the order of $10^8$ volt/cm. or more will be produced locally in the insulator layer 13 near the perimeter of the electrode 14, the maximum electric fields produced locally in the insulator layer 13 near the perimeter of the silicon substrate 11 will be much smaller. In this way, injection of electrons from the silicon substrate 11 into the insulator layer 13 will not occur even during that part of the AC cycle of the source 15 during which the silicon substrate 11 is made electrically negative with respect to the grid electrode 14. However, during that portion of the AC cycle in which the grid electrode 14 is made electrically negative, electrons will be injected into and traverse the insulator layer 13, thereby allowing a current to flow through the DC utilization means 16 only during that portion of the cycle.

While the silicon substrate 11 preferably is degenerate N-type silicon semiconductor, it should be understood that this substrate can also be nondegenerate N- or P-type or even degenerate P-type silicon semiconductor.

In the specific embodiment illustrated in the FIGURE, the silicon substrate 11 serves both as an electrode in combination with the plate 12 and as a substrate for the growth of the silicon dioxide insulator layer 13. As an alternative, an aluminum oxide layer can be deposited upon an aluminum sheet by means of plasma anodization, thereby furnishing an equivalent for the silicon dioxide layer 13 and the silicon substrate 11 as well as for the plate 12. Thus, in combination with a grid electrode 14, on the exposed surface of the aluminum oxide, a simpler metal-insulator-metal structure can be used as the rectifying diode in this invention. Moreover, beryllium, magnesium or other suitable metals may be substituted for aluminum as the substrate for the formation of an oxide layer by plasma anodization.

While the electrode layer 14 illustrated in the FIGURE is in the form of a rectangular-shaped gold crossgrid, other configurations can be used, such as spiral or parallel grids, as well as other electrically conductive materials.

Although this invention has been described in terms of specific embodiments, it should be understood that various modifications can be made without departing from the scope of the invention.

What is claimed is:

1. An electrical rectifying device having a rectification ratio of at least $10^{14}$, which comprises:

an insulator layer, at least 2,000 A. thick having a resistivity of at least $10^{18}$ ohm-cm., sandwiched between a pair of electrodes, the effective perimeter of contact with the insulator layer by one of the electrodes being at least an order of magnitude larger than that of the other electrode.

2. The device recited in claim 1 in which said one of the electrodes is in the geometrical form of a crossed grid configuration.

3. The device recited in claim 1 in which the insulator layer is silicon dioxide which has been thermally grown in a dry environment upon a substrate of silicon, the other electrode including the said substrate.

4. The device recited in claim 1 in which the insulator layer is aluminum oxide.

5. The device recited in claim 1 in which the insulator layer is an oxide of the group consisting of magnesium and beryllium.

6. An electrical network which comprises:

a. the rectifying device recited in claim 1; and b. means for applying to the electrodes an AC voltage source to produce a rectified current.

7. An electrical network which comprises:

a. an AC voltage source;

b. the rectifying device recited in claim 1;

c. a DC utilization means, and d. electrically conductive means connecting together serially the AC source, the device, and the DC utilization means.

* * * * *